(12) United States Patent
Harvey et al.

(10) Patent No.: US 7,959,195 B2
(45) Date of Patent: Jun. 14, 2011

(54) LOCK ARRANGEMENT

(75) Inventors: John Herbert Harvey, Wolverhampton (GB); David John Holman, Wolverhampton (GB)

(73) Assignee: Goodrich Actuation Systems Limited (GB)

( * ) Notice: Subject to any disclaimer, the term of this patent is extended or adjusted under 35 U.S.C. 154(b) by 822 days.

(21) Appl. No.: 11/377,846

(22) Filed: Mar. 16, 2006

(65) Prior Publication Data

US 2006/0208501 A1    Sep. 21, 2006

(30) Foreign Application Priority Data

Mar. 21, 2005    (GB) .................... 0505612.2

(51) Int. Cl.
*E05C 3/04* (2006.01)
*E05C 3/06* (2006.01)

(52) U.S. Cl. ............ 292/201; 292/95; 292/98; 292/130; 292/216; 292/DIG. 54; 292/DIG. 60; 292/DIG. 65; 292/210; 49/394

(58) Field of Classification Search .................... 292/24, 292/27, 95, 98, 102, 108, 130, 132, 196, 292/201, 210, 216, 230, 304, DIG. 49, DIG. 54, 292/DIG. 60, DIG. 65; 60/226.2; 70/19; 49/141, 394; 239/265.29; 244/23 D
See application file for complete search history.

(56) References Cited

U.S. PATENT DOCUMENTS

| | | | | |
|---|---|---|---|---|
| 2,567,114 A * | 9/1951 | Linn | ........................ | 244/102 SL |
| 3,347,578 A * | 10/1967 | Sheehan et. al. | ............... | 292/113 |
| 3,504,406 A * | 4/1970 | Schott | .............................. | 24/603 |
| 3,576,337 A * | 4/1971 | Gudde | ........................ | 292/201 |
| 3,600,023 A * | 8/1971 | Gudde | ........................ | 292/201 |
| 4,142,751 A * | 3/1979 | Varda | ............................ | 292/217 |
| 4,230,352 A * | 10/1980 | Sealey et al. | ............. | 292/341.17 |
| 4,690,232 A * | 9/1987 | Schulz | ........................ | 180/89.14 |
| 5,257,840 A * | 11/1993 | Rouzaud | ....................... | 292/201 |
| 5,288,037 A * | 2/1994 | Derrien | ................... | 244/102 SL |
| 5,344,197 A * | 9/1994 | Rouzaud | ........................... | 292/5 |
| 5,404,714 A * | 4/1995 | Davies | ......................... | 60/226.2 |
| 5,547,130 A * | 8/1996 | Davies | ..................... | 239/265.29 |
| 5,735,557 A * | 4/1998 | Harvey | ........................ | 292/216 |
| 5,953,904 A * | 9/1999 | Mountney | .................... | 60/226.2 |
| 5,984,383 A * | 11/1999 | Parikh et al. | ................... | 292/121 |
| 6,139,073 A * | 10/2000 | Heffner et al. | ................ | 292/201 |
| 6,145,786 A * | 11/2000 | Baudu et al. | ............. | 244/110 B |
| 6,811,118 B2 * | 11/2004 | Collet et al. | ............. | 244/102 SL |
| 7,146,796 B2 * | 12/2006 | Lair | ............................. | 60/226.2 |
| 7,360,803 B2 * | 4/2008 | Parent et al. | ................... | 292/216 |

FOREIGN PATENT DOCUMENTS

EP    265197 A2 *    4/1988
GB    2161202 A *    1/1986

* cited by examiner

*Primary Examiner* — Carlos Lugo
(74) *Attorney, Agent, or Firm* — Andrus, Sceales, Starke & Sawall, LLP

(57) ABSTRACT

A lock arrangement comprises a first jaw component (28) pivotally moveable about a pivot axis (12), a second jaw component (30) releasably securable to the first jaw component (28) to form a pivotable jaw assembly (10), and an actuator arrangement operable to drive the jaw assembly from a locked position to a released position.

12 Claims, 4 Drawing Sheets

LOCK ARRANGEMENT

This invention relates to a lock arrangement, and in particular to a lock arrangement for use in securing the driven doors of an aircraft in their closed positions.

A number of aircraft designs include doors which are driven between their open and closed, or operative and rest conditions. For example, the lift fan doors of an aircraft of the type designed for vertical take-off and/or landing are driven between a closed position for normal flight and an open position for vertical or near vertical take-off an/or landing and/or hovering. The landing gear doors of an aircraft are also driven between their closed positions and open positions to allow the deployment and retraction of the landing gear.

A hook-shaped lock member of a lock arrangement co-operates with a locking pin and roller on the associated door, in use, to hold the door tightly closed during normal flight so as to reduce the risk of the door opening other than when desired. When the door is to be opened, the lock arrangement is actuated to move the lock member and thereby allow the pin and roller to be released so that the door can be moved to an open position.

There is a risk, with such an arrangement, that failure of the actuator of the lock arrangement could prevent the door from being driven to its open position. If the door cannot be moved to its open position, the safety of the aircraft itself could be put at risk as a safe or normal landing may no longer be possible.

It is an object of the invention to provide a lock arrangement whereby door release can still be accomplished even in the event of the failure of the actuator of the lock arrangement.

According to the present invention there is provided a lock arrangement comprising a first jaw component pivotally moveable about a pivot axis, a second jaw component releasably securable to the first jaw component to form a pivotable jaw assembly, and an actuator arrangement operable to drive the jaw assembly from a locked position to a released position, wherein the second jaw component can be released from the first jaw component to allow movement of the second jaw component independently of operation of the actuator arrangement.

In normal use, the lock arrangement operates in a manner similar to that described hereinbefore. However, in the event of a failure, the first and second jaw components can be allowed to move relative to one another so as to release, for example, the pin and roller of the door with which the lock arrangement is used and thereby allow the door to be moved to its open or deployed position.

The actuator arrangement preferably comprises an over-centre linkage arrangement arranged to be driven by a motor, for example in the form of an hydraulic linear actuator. A spring may be provided to hold the linkage arrangement in its over-centre position(s).

Such an arrangement is advantageous in that, when the jaw assembly occupies its locked position, the application of a loading thereto by the door with which the lock arrangement is associated will not result in movement of the jaw assembly in a direction to release the door. Once the actuator arrangement has moved the jaw assembly to its released position, subsequent movement of the door can move the jaw assembly to an open position. The further movement of the jaw assembly may be assisted by the actuator arrangement. Preferably the over-centre linkage arrangement is designed such that once in its open position, the actuator is unable to drive the jaw assembly back to its locked position, so the jaw assembly will remain in its open position until the door is returned towards its closed position, such movement contacting the lock and causing the jaw assembly to be moved to a second released position after which it can be driven to its locked position by the actuator arrangement, possibly assisted by continued movement of the door.

When released from the first jaw component, the second jaw component is preferably pivotable about an axis other than the said pivot axis. The second jaw component is preferably pivotally connected to the actuator arrangement.

The first and second jaw components conveniently include regions which overlie one another and are provided with inter-engaging formations such that, when a clamping load is applied to the first and second jaw components, they are rigidly secured to one another. Removal of the clamping load allows relative movement to occur therebetween.

A resilient biasing arrangement may be provided to assist in ensuring that, in the event of the release of the clamping load, the inter-engaging formations disengage to allow relative movement between the first and second jaw components.

The clamping load may be applied by a pivotable cam moveable by an actuator.

A third jaw component may be provided, part of the second jaw component being sandwiched between the first and third jaw components.

The inter-engaging formations could take a range of forms, for example a series of inter-engaging teeth, or a ball-ramp arrangement. One suitable form of toothed arrangement makes use of a Hirth-type coupling.

The invention will further be described, by way of example, with reference to the accompanying drawings, in which.

Figure 1:
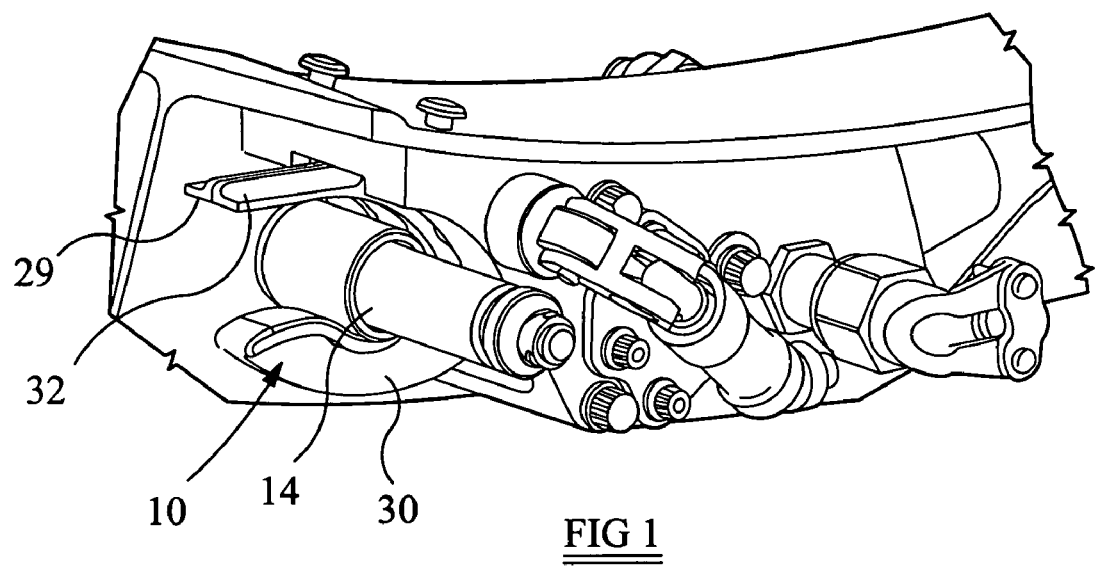
FIG. 1 is a perspective view illustrating a lock arrangement in accordance with one embodiment of the invention in its closed condition.
Figure 2:
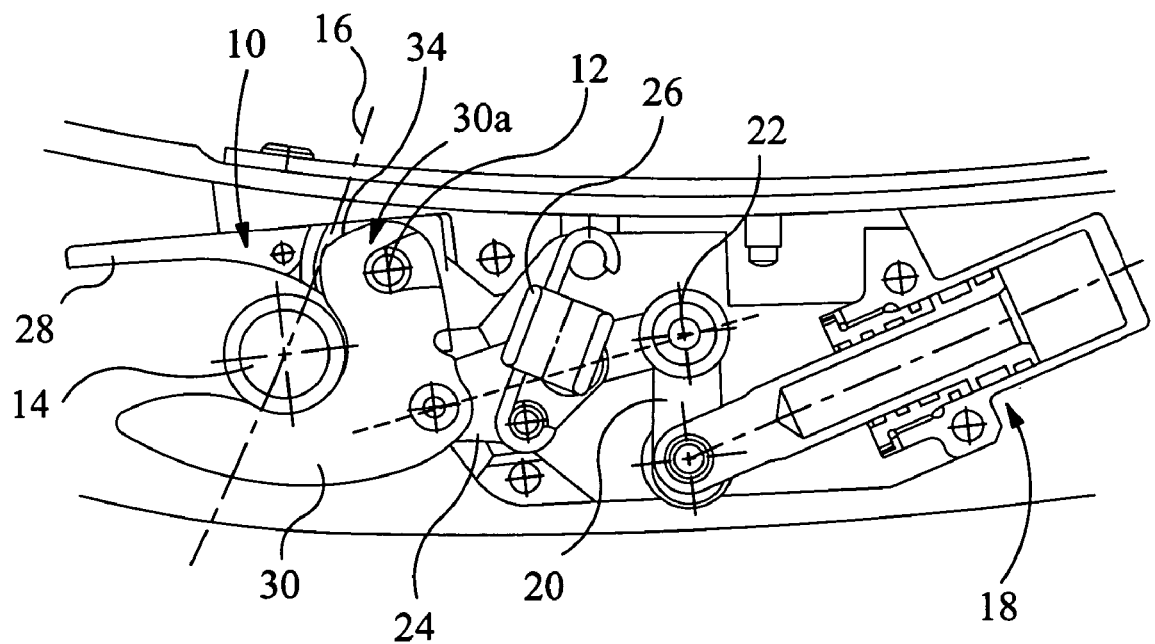
FIGS. 2, 3 and 4 are sectional views illustrating the lock arrangement in its closed, open and emergency released conditions.
Figure 3:
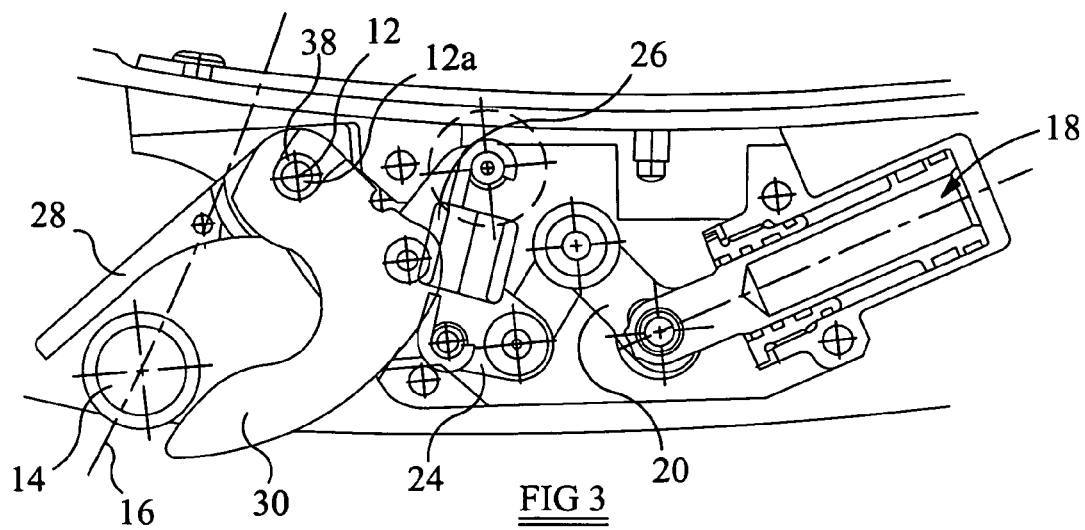

The lock arrangement illustrated in FIGS. 1 to 5 comprises a jaw assembly 10 which is pivotally moveable about a pivot axis 12, the jaw assembly 10 being supported for such movement by a pivot pin 12a. The jaw assembly 10 is of generally hook-shaped form and is moveable between a locked position as illustrated in FIG. 2 and an open position as illustrated in FIG. 3. It will be appreciated that with the jaw assembly 10 held in the locked position illustrated in FIG. 2, movement of a locking pin and roller assembly 14 associated with a moveable door of an aircraft in the direction of the dashed line 16 in FIG. 2 is not permitted, the pin and roller 14 being held within the recess of the jaw assembly 10, but that once the jaw assembly 10 has pivoted to the position illustrated in FIG. 3, the pin and roller assembly 14 is free to move away from the jaw assembly 10 thereby permitting movement of the door with which the pin and roller assembly is associated to its fully open position under the control of the actuators associated with the door.

As illustrated in FIG. 2, an actuator arrangement is provided to control movement of the jaw assembly 10. The actuator arrangement comprises a hydraulically actuated linear actuator 18 operable to move one end of a generally L-shaped crank 20 which is mounted for pivotal movement about pivot point 22. The end of the crank 20 remote from the actuator 18 is connected via a linkage 24 to the jaw assembly 10. The actuator arrangement further comprises a biasing arrangement in the form of a spring 26 connected to the linkage 24.

The actuator arrangement is an over-centre linkage arrangement with the result that with the jaw assembly 10 in its locked position as shown in FIG. 2, the application of a load to the jaw assembly 10 by the pin and roller assembly 14 to try to force the jaw assembly 10 to move towards its open position will not result in pivoting movement of the jaw assembly 10. Rather, in order to move the jaw assembly 10 from its locked position to its open position, the actuator 18 must be operated to move the crank 20 at least to a first released position in which the point of pivotal connection of the crank 20 to the linkage 24 is beneath a notional line interconnecting the pivot point 22 with the point of pivotal connection between the linkage 24 and the jaw assembly 10 (in the orientation illustrated).

Once the first released position has been attained, further movement of the jaw assembly 10 towards its open position as illustrated in FIG. 3 can be achieved either under the operation of the actuator arrangement or under the application of a loading to the jaw assembly 10 by the pin and roller assembly 14. In practice, the movement of the jaw assembly 10 to its open position will often be as a result of the combination of these forces.

Once in its open position as shown in FIG. 3, the nature of the linkage arrangement is such that the actuator arrangement is unable to return the jaw assembly 10 towards its closed position. This is because, in this position, the point of pivotal connection between the linkage 24 and the jaw assembly 10 is on or above a notional line (in the orientation illustrated) interconnecting the point of pivotal connection between the crank 20 and the linkage arrangement 24 and the pivot axis 12. As a result, in normal use, when the jaw assembly 10 has been moved to its open position, it will remain in its open position until the door with which the lock arrangement is used is returned towards its closed position. During closing movement of the door, the pin and roller assembly 14 will re-enter the recess of the jaw assembly 10 and engage against parts thereof to cause initial movement of the jaw assembly 10. Once such triggering movement has resulted in the point of pivotal location of the linkage 24 and the jaw assembly 10 being moved to a position beneath a notional line interconnecting the point of pivotal connection between the crank 20 and the linkage 24 and the pivot axis 12, then the actuator 18 can also be used to drive the jaw assembly 10 towards its locked position and, in practice, the movement of the jaw assembly 10 is likely to be as a result of the combination of the forces applied thereto by the door and the force applied thereto by the actuator 18.

The spring 26 holds the linkage 24 in both over-centre conditions of the actuator arrangement.

In the event that the actuator arrangement fails, for example due to a failure of the hydraulic actuator 18, or jamming or buckling of the crank 20 or linkage 24, it will be appreciated that there is the risk that the lock assembly 10 could become stuck in its locked condition. Obviously, this would prevent the associated door from opening and, depending upon the application in which the door is used, this could have catastrophic effects upon the continued flight of the aircraft.

In order to avoid this, in accordance with the invention the jaw assembly 10 takes the form of a multi-part body. As illustrated in FIG. 1, the jaw assembly 10 comprises a first jaw component 28, a second jaw component 30 and a third jaw component 32. The first and third components 28, 32 when located adjacent one another together define a recess within which part 30a of the second component 30 is located. The first and second components 28, 30 therefore have regions 34 which overlie one another. Likewise, the second and third components have regions 34 which overlie one another. These regions of the components 28, 30, 32 are provided with inter-engaging formations arranged such that, when the first, second and third components 28, 30, 32 are clamped together by an external clamping load, the inter-engaging formations prevent or restrict relative movement between the components such that in normal use they act as a single body.

The first and third components 28, 32 are provided with openings through which the pivot pin 12a used to provide pivotal mounting of the jaw assembly 10 passes, and thus these components are pivotally mounted in position. The second component 30 is the only one of the three components to which the linkage 24 is pivotally connected and, rather than being provided with an opening through which the pivot pin 12a passes, this component is provided with a slot 36 through which the pivot pin extends in normal use.

Figure 5:
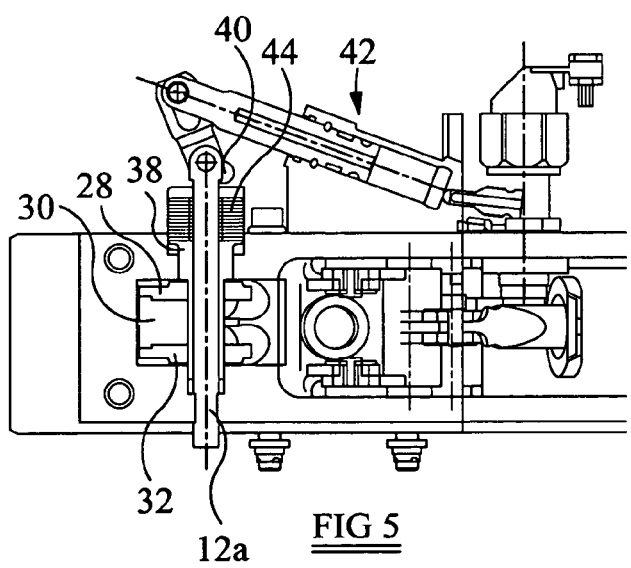
FIG. 5 is another sectional view of the lock arrangement.

As illustrated in FIG. 5, a clamping arrangement is provided to provide a clamping load to the first, second and third components 28, 30 and 32. The clamping arrangement comprises a sleeve 38 surrounding the pivot pin 12a and axially moveable with respect thereto, the sleeve 38 defining a shoulder engageable with the first component 28. A cam 40 is pivotally connected to an extension of the pivot pin 12a, the cam being moveable between a release position and a clamping position in which it applies a clamping force to the sleeve 38 which, in turn, is transmitted to the first, second and third components 28, 30, 32 to clamp these components to one another. An actuator arrangement 42 is provided to control movement of the cam 40. A series of springs 44 is provided through which the clamping force is transmitted, the springs 44 ensuring that, when the cam 40 is moved towards a position in which no clamping load is to be applied, the cam 40 continues to move in this direction to remove such clamping load from the first, second and third components.

In normal operation of the lock arrangement, the jaw assembly moves as a single unit, as described hereinbefore, under the control of the actuator arrangement, some of the movement of the jaw assembly 10 being achieved by the engagement of the jaw assembly 10 with the pin and roller assembly 14 of the associated door.

Figure 4:
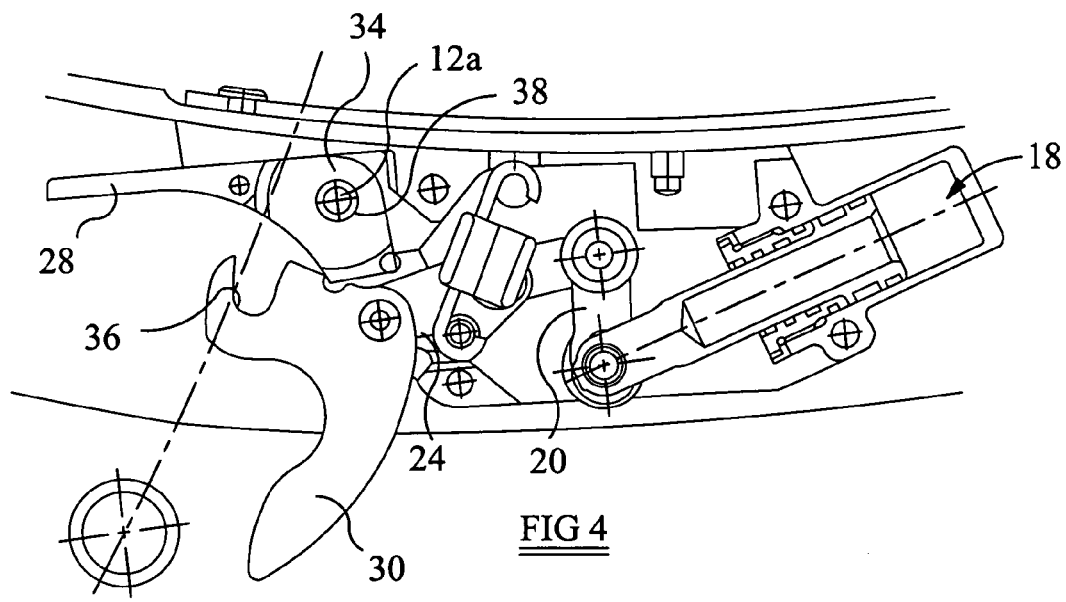

In the event that there is a failure of the actuator arrangement with the result that the door becomes jammed in its closed position, in order to allow the door to be moved to its open position the actuator 42 is operated to cause movement of the cam 40 so that the clamping load is no longer applied by the cam 40 to the sleeve 38 and first, second and third components 28, 30, 32. Upon the release of the clamping load 40, the first, second and third components 28, 30, 32 are allowed to separate from one another along the axis 12. Once such separation has occurred to an extent to allow the inter-engaging formations provided on the first, second and third components 28, 30, 32 to disengage from one another, it will be appreciated that the second component 30 can pivot about the pivotal connection of this component with the linkage 24 so as to become released from the pivot axis 12. This movement may occur under the action of gravity or alternatively may occur as a result of commencement of movement of the door under the operation of its own actuators and the associated movement of the pin and roller assembly 14. FIG. 4 illustrates the lock arrangement in this condition. Clearly, this allows the deployment of the door despite the actuator arrangement associated with the lock arrangement of the door having failed.

The inter-engaging formations provided on the first, second and third components could take a range of forms. For example, the inter-engaging formations may comprise a series of inter-engaging teeth. Alternatively it may be possible to use a ball or roller and ramp-type arrangement. One toothed arrangement which is currently envisaged is a Hirth-type coupling. However, it will be appreciated that a range of other types of inter-engaging formation could be used.

If desired, sensors may be provided to sense whether the jaw assembly moves, when desired, the actuator 42 being operated automatically in the event that the jaw assembly fails to move when expected so as to automatically release the pin and roller assembly 14.

Further, although the description hereinbefore refers to a three-part jaw assembly 10, it will be appreciated that this need not always be the case and arrangements are possible having fewer or a greater number of components.

Figure 6:
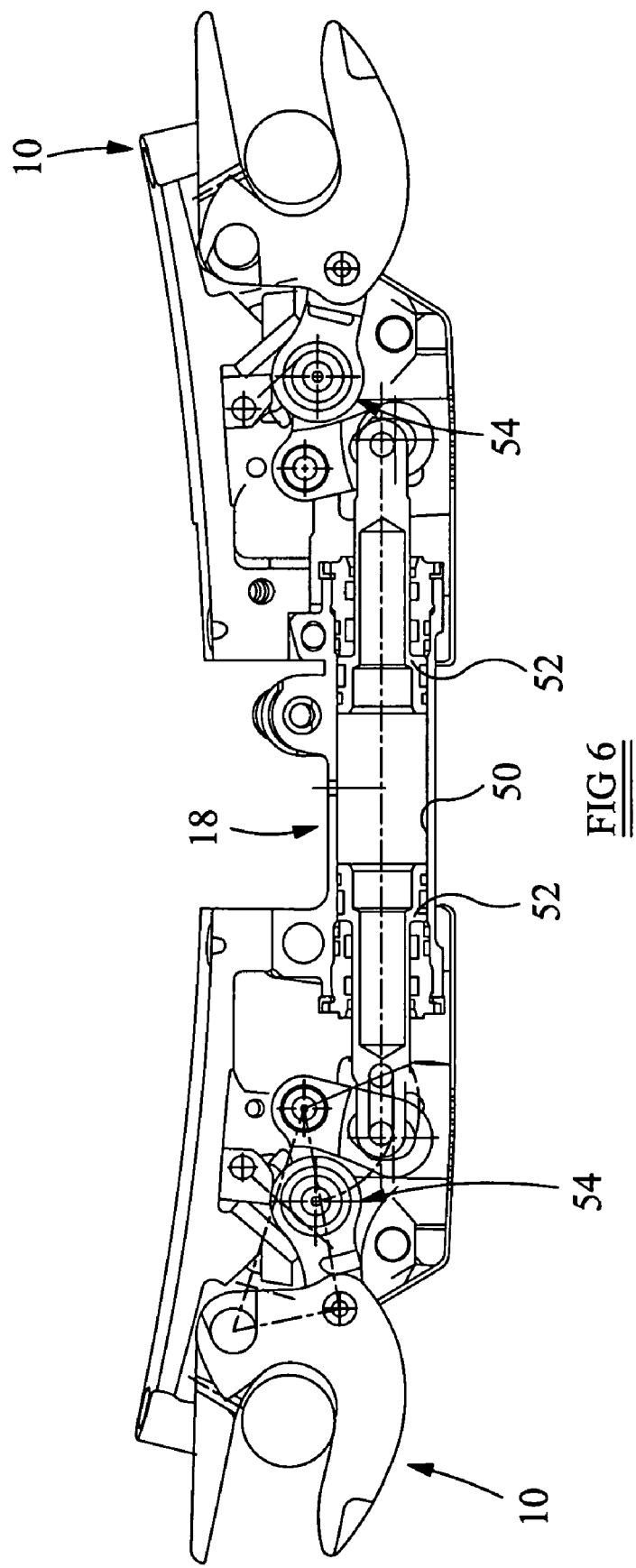
FIGS. 6 to 8 illustrate a modified design of lock arrangement.
Figure 7:
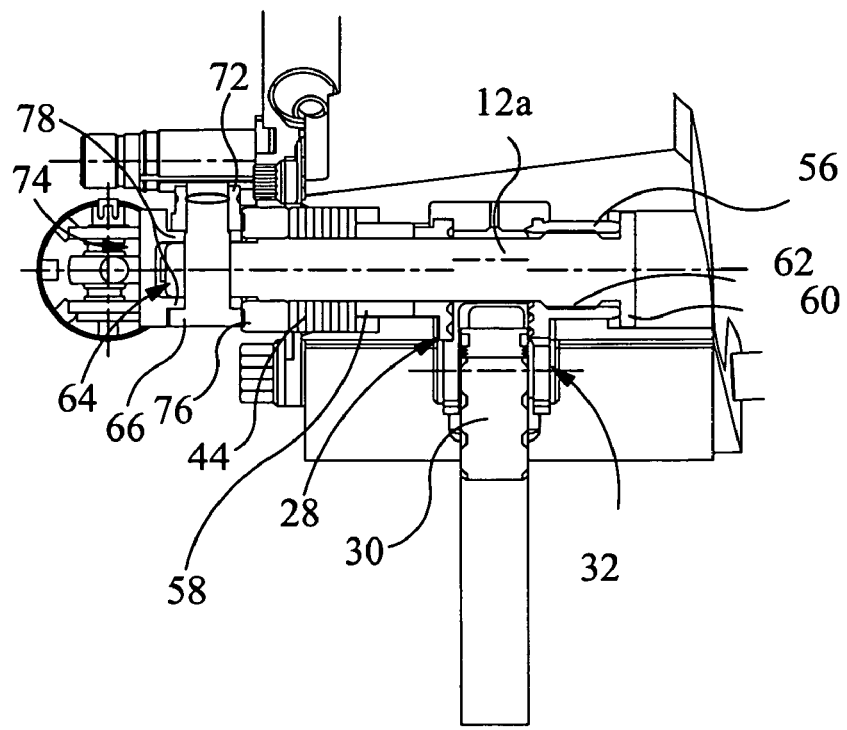
Figure 8:
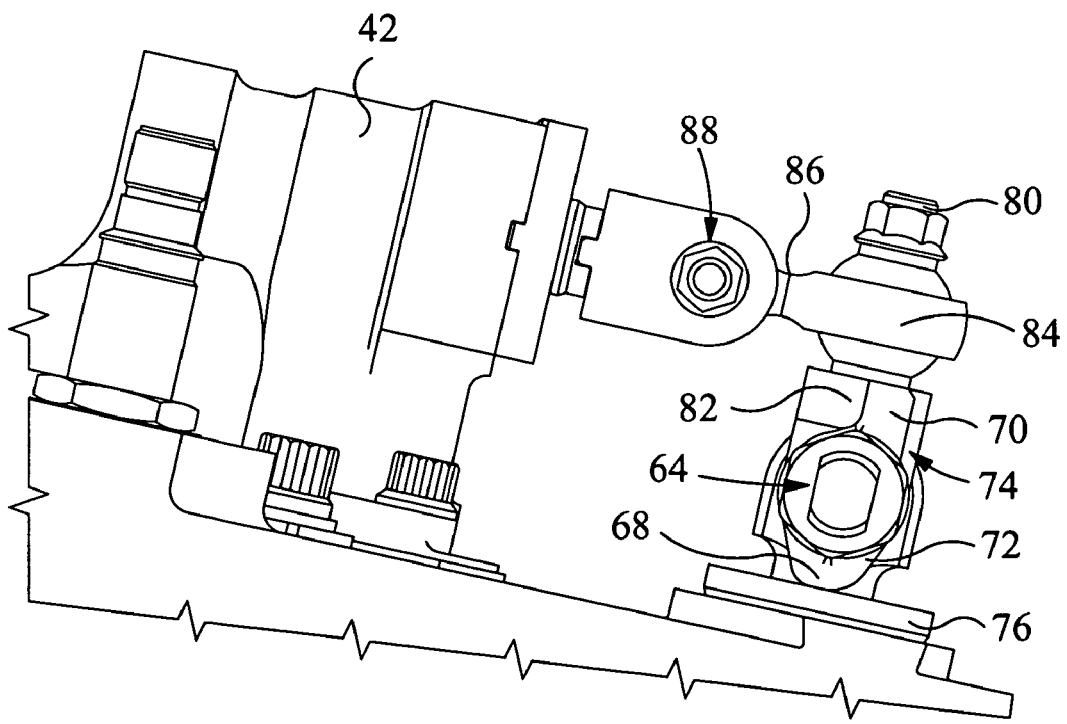

FIGS. 6 to 8 illustrate an arrangement similar to that described hereinbefore and illustrated in FIGS. 1 to 5. Only the significant differences between the two arrangements are described.

A first distinction is that, as shown in FIG. 6, two jaw assemblies 10 and associated linkage arrangements are provided, both being operable by a common hydraulically actuated linear actuator 18. The actuator 18 comprises a cylinder 50 in which a pair of pistons 52 are located, each piston 52 being connected to an associated one of the linkage arrangements to drive an associated one of the jaw assemblies 10 for movement as described hereinbefore, either with or without the application of an assisting load from the associated pin and roller assembly 14. It will be appreciated that such an arrangement is advantageous in that the number of actuators used, and the associated cost, weight and complexity of the associated control arrangement can be reduced.

Another distinction between the arrangement of FIGS. 6 to 8 and the arrangement of FIGS. 1 to 5 is that, as shown in FIG. 6, the connection between the L-shaped crank 20 and the linkage 24, instead of comprising a simple pivotal connection achieved, for example, simply by rivetting the components to one another, comprises a spherical bearing 54. The provision of such a spherical bearing 54 permits accommodation of twisting or tilting movement of the second jaw component 30 as may occur in use. The risk of jamming of the linkage arrangement or jaw assembly during separation of the jaw components by the application of such loadings is thereby reduced.

In the arrangement of FIGS. 1 to 5, in normal operation the biassing or clamping load applied by the cam 40 and the springs 44 to the sleeve 38 results in the third jaw component 32 being forced against the wall of the housing with which the jaw assembly 10 is associated. This results in an increase in the frictional forces resisting normal movement of the jaw assembly 10, placing additional strain on the linkage arrangement and the actuator. In the arrangement of FIGS. 6 to 8, this is avoided. Instead of forcing the third component 32 against the associated housing, the clamping load simply clamps the jaw components 28, 30, 32 to one another. As shown in FIG. 7, the pivot pin 12a extends through openings formed in the first and third components 28, 32. The third component 32 includes an integral cylindrical region 56 forming a cylindrical bearing which, preferably, is PTFE coated, locating and supporting the third component 32 for angular movement. A cylindrical bearing element 58, also preferably PTFE coated, is located on the pivot pin 12a adjacent the first component 28 to support the pivot pin 12a and hence the components 28, 32. The pivot pin 12a is provided with an enlarged head 60 which bears against the region 56, and a spline arrangement 62 is provided to key the pivot pin 12a to the third component 32.

A cam component 64 is pivotally mounted upon the pivot pin 12a and is moveable between a release position and a clamping position in which it compresses springs 44 which, in turn apply a compressive load clamping the first, second and third components 28, 30, 32 to one another. The reaction loads are born by the pivot pin 12a thereby avoiding the application of increased frictional forces as mentioned hereinbefore. Further, the pivot pin 12a is splined to the third component 32 so as to resist relative movement therebetween.

The cam component 64 comprises an element, having a head 66 and a shaft. The head 66 is shaped to define a cam region 68 and a drive region 70. The shaft of the element passes through an opening provided in the pivot pin 12a and carries a component 72 of shape similar to the head 66. The component 72 is secured in position using, for example, a transversely extending screw or bolt. The part of the shaft carrying the component 72 is of a non-circular shape so as to key the component 72 thereto so as to hold the component 72 in angular alignment with the head 66. The cam regions 68 of the head 66 and the component 72 bear against a load spreading washer 76 which, in turn, engages one end of the springs 44.

A yoke 74 is carried by the cam component 64, the yoke 74 comprising a pair of drive plates 78 interconnected by a region on which a threaded shaft 80 is formed. Each drive plate has formed thereon a drive projection 82 engageable with the drive region 70 of an associated one of the head 66 and the component 72. The shaft 80 is coupled through a spherical bearing 84 with a link 86 connected through another spherical bearing 88 to the actuator arrangement 42.

In normal use, the cam component 64 occupies the orientation shown in FIG. 8 in which the springs 44 are compressed and a significant clamping load is applied to the jaw components 28, 30, 32. As mentioned hereinbefore, the reaction load is not transmitted to the housing, so the application of the clamping load does not interfere with movement of the jaw assembly. In the event that the actuator 18 and/or associated linkage arrangement fails, the actuator arrangement 42 is driven to cause clockwise movement of the yoke 74 in the orientation shown in FIG. 8. The engagement between the drive projection 82 and the drive region 70 causes similar movement of the cam component 64 resulting in a reduction of the stressing of the springs 44 and so in a reduction in the clamping load with the result that the jaw components 28, 30, 32 are able to separate as shown in FIG. 7 to allow the pin and roller arrangement 14 to be released. Once movement of the cam component 64 away from the FIG. 8 position has commenced, the springs 44 continue to drive the cam component 64 until a stable position is reached even though movement of the yoke 74 may have already ceased.

To ensure correct alignment during assembly, the spline arrangement 62 is conveniently designed to only allow the pivot pin 12a to be fitted to the third jaw component 32 in a single angular orientation.

Other than as described herein, operation of the arrangement shown in FIGS. 6 to 8 is substantially the same as that illustrated in FIGS. 1 to 5.

The lock arrangement described hereinbefore are particularly suitable for use with the lift fan doors of an aircraft of the type designed for vertical or near-vertical take-off or landing or having the ability to hover, but are also suitable for use with the landing gear doors of an aircraft or may be used in other applications.

The invention claimed is:

1. A lock arrangement comprising a first jaw component pivotally moveable about a pivot axis, a second jaw component, a releasable clamping arrangement that applies a clamping load to rigidly secure the second aw component to the first jaw component to form a substantially rigid pivotable jaw assembly, an actuator arrangement operable to drive the jaw assembly, as a single unit, between a lock position and an unlock position, wherein in the event of failure of the actuator arrangement, the clamping load can be removed by operation of the releasable clamping arrangement to release the second jaw component from the first jaw component and allow movement of the second jaw component to an emergency release position independently of the first jaw component, wherein when released from the first jaw component by operation of said releasable clamping arrangement, the second jaw component is pivotable about an axis other than the pivot axis.

2. A lock arrangement according to claim 1, wherein the actuator arrangement comprises an over-centre linkage arrangement arranged to be driven by a motor and pivotally connected to the second jaw component.

3. A lock arrangement according to claim 2, wherein the over-centre linkage arrangement incorporates a spring to hold the linkage arrangement in its over-centre position(s).

4. A lock arrangement according to claim 2, wherein the motor comprises an hydraulic linear actuator.

5. A lock arrangement according to claim 1, further comprising a second pivotable jaw assembly having the same structure as the first jaw assembly arranged to be driven by the actuator arrangement.

6. A lock arrangement according to claim 1, wherein the second jaw component is pivotally connected to the actuator arrangement.

7. A lock arrangement according to claim 1, wherein the releasable clamping arrangement comprises a cam moveable by an actuator.

8. A lock arrangement according to claim 1, further comprising a third jaw component, part of the second jaw component being sandwiched between the first and third jaw components.

9. A lock arrangement comprising a first jaw component pivotally moveable about a pivot axis, a second jaw component, a releasable clamping arrangement that applies a clamping load to rigidly secure the second jaw component to the first jaw component to form a substantially rigid pivotable jaw assembly, an actuator arrangement operable to drive the jaw assembly, as a single unit, between a lock position and an unlock position, wherein in the event of failure of the actuator arrangement, the clamping load can be removed by operation of the releasable clamping arrangement to release the second jaw component from the first jaw component and allow movement of the second jaw component to an emergency release position independently of the first jaw component, wherein the releasable clamping arrangement comprises a pivotable cam moveable by an actuator, a pivotable yoke being arranged to be moved by the actuator and to transmit movement to the pivotable cam.

10. A lock arrangement comprising a first jaw component pivotally moveable about a pivot axis, a second jaw component, a releasable clamping arrangement that applies a clamping load to rigidly secure the second jaw component to the first jaw component to form a substantially rigid pivotable jaw assembly, an actuator arrangement operable to drive the jaw assembly, as a single unit between a lock position and an unlock position, wherein in the event of failure of the actuator arrangement, the clamping load can be removed by operation of the releasable clamping arrangement to release the second jaw component from the first jaw component and allow movement of the second jaw component to an emergency release position independently of the first jaw component, wherein the releasable clamping arrangement comprises a pivotable cam moveable by an actuator, the pivotable cam being mounted upon a pivot pin.

11. A lock arrangement according to claim 10, wherein the pivot pin applies the clamping load to a face of the jaw assembly remote from the pivotable cam.

12. A lock arrangement comprising:
a first jaw component pivotally moveable about a pivot axis;
a second jaw component releasably secured to the first jaw component to form a pivotable jaw assembly, the jaw assembly moves between a lock and an unlock position;
an actuator arrangement comprising an over-centre linkage assembly and an actuator, the actuator is connected to one end of the linkage assembly and the second jaw component is pivotally connected to the opposed end of the linkage assembly;
a clamping arrangement comprising a clamping actuator and a cam, the clamping arrangement applying a clamping load to the jaw assembly to maintain the first jaw component secured to the second jaw component;
wherein, during normal operation, the actuator arrangement will move the jaw assembly, as a single unit, between the lock and an unlock position;
wherein, in the event that there is a failure of the actuator arrangement, the clamping load exerted by the cam to the jaw assembly can be removed by operation of the clamping actuator, allowing the second jaw component to be disengaged from the first jaw component, so that the second jaw component is capable of moving independently from the first jaw component to allow the jaw assembly to move toward an emergency release position.

* * * * *